Feb. 14, 1961  R. J. HABER  2,971,727
ENERGY ABSORBING MEANS AND RETRIEVING CAPSULE
Filed Dec. 4, 1957  2 Sheets-Sheet 2
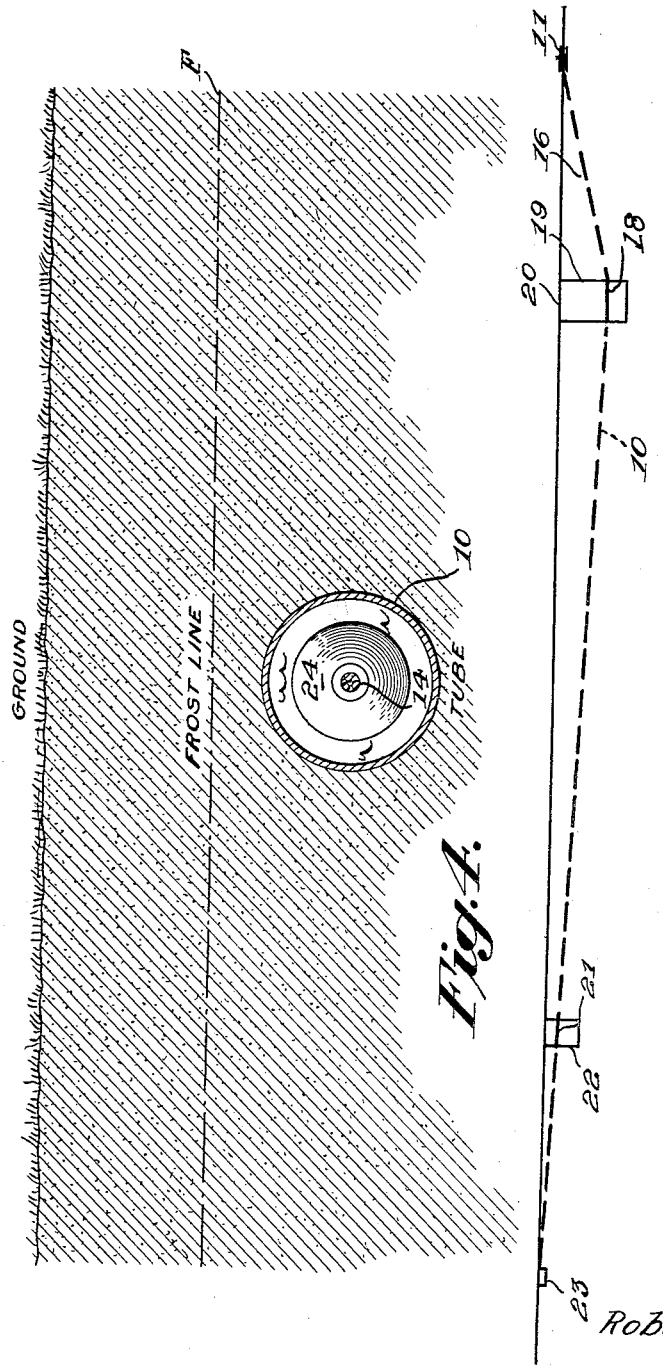
INVENTOR
Robert J. Haber.
BY
ATTORNEY

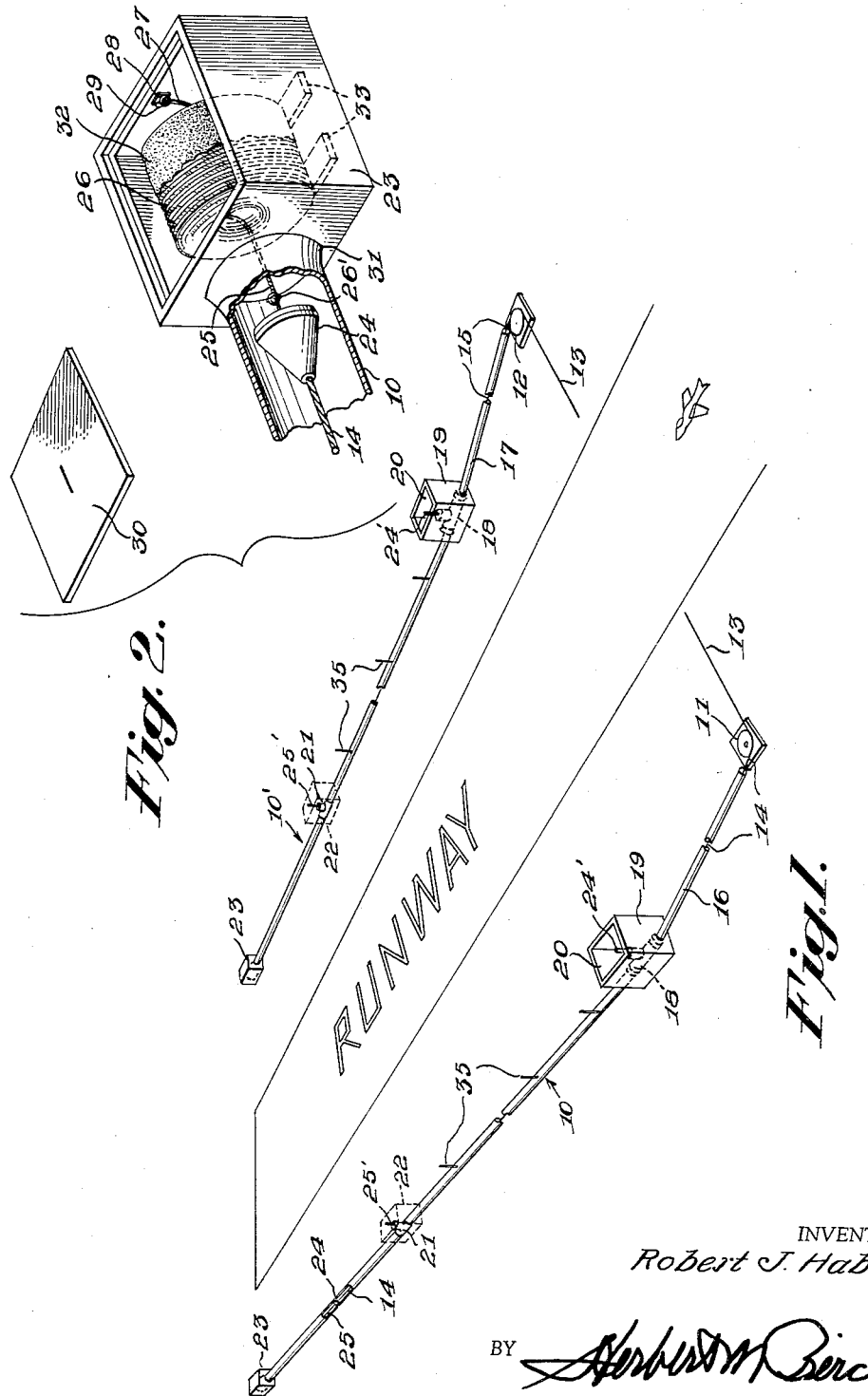

United States Patent Office 2,971,727
Patented Feb. 14, 1961

2,971,727

ENERGY ABSORBING MEANS AND RETRIEVING CAPSULE

Robert J. Haber, Wilmington, Del., assignor to All American Engineering Company, Wilmington, Del., a corporation of Delaware Filed Dec. 4, 1957, Ser. No. 700,644

3 Claims. (Cl. 244—110)

The present invention relates to energy absorbing means for arresting aircraft of the tube and piston type, wherein a loose-fitting piston is cable pulled through the fluid in the tube when the object being decelerated imparts pull to the piston through the cable.

Energy absorbers of this type are illustrated and described in prior Patents 2,731,219, issued January 17, 1956, and 2,777,653, issued January 15, 1957. Such prior art devices have efficient means to retrieve the arresting piston therein following each arrest operation, but heretofore these retrieving systems have been more complex and more costly than is desirable particularly for certain emergency economical installations. Accordingly, an object of this invention is to provide an economical, simple, low maintenance and quick-replaceable retrieving unit for retrieving an arresting piston in an energy absorber tube after each emergency arrest.

Another object is to provide a quick replaceable rope capsule for use in combination with an energy absorber device, whereby such capsules may be stored and be available for immediate quick-connection with the energy absorber's piston device.

Another object is to provide a special all-weather installation for the arrest engine tubing below the frost line, whereby the retrieving and arrest ends of the installation are readily accessible at ground level for maintenance and whereby the unit may be reloaded with a retrieving capsule after each arrest and retrieve operation.

With the above and other objects in view, the invention consists in the construction, arrangement and combination of parts hereinafter described and particularly set forth in the appended claims.

In the drawings like parts throughout the several views are given like numerals and are thus identified in the following detailed description.

Figure 1 is an aerial perspective view of a landing strip or runway with an illustration of the present novel installation arrangement;

Figure 2 is an isometric drawing of the retrieving end of the installation, illustrating the retrieving capsule and its connections with the arrest piston and supports therefor in the retrieve pit;

Figure 3 is a side view in schematic elevation of the installation on one side of the landing strip or runway, illustrating the relation of the overall arrest tube portions with respect to the ground level, and Figure 4 is a transverse section from ground level through the frost line on the arrest portion of the arrest tube as a further illustration of the installation.

Referring in detail to the drawings and with particular reference to Figure 1, there is illustrated a complete installation of the present invention on each longitudinal side of a landing surface indicated "Runway." The installation consists of a series of tube sections joined together to form an arrest tube 10. The tube 10 is duplicated on each side of the landing surface and includes an arrest end and a retrieve end. The arrest end comprises ground level supported arrest sheaves 11 and 12 around which is reeved an arrest pendant 13, which pays out or leads off from the respective energy absorber arrest cables 14 and 15. The pendant may be separable from the respective arrest cables 14 and 15 or the arrest cable may be made continuous so that the pendant 13 is an integral part thereof, if desired. In either event the operation is the same. The arrest cable portions 14 and 15 lead angularly downward into the respective arrest tubes 10 and 10' through the downwardly directed lead pipes or tubes 16 and 17 to a T-coupling 18 in an underground pit formed by a concrete housing 19 having an opening 20 at ground level. The coupling 18 is sufficiently below ground level to be considerably below the known frost line F, see Figure 3, of any particular locality in which the installation is made.

Coupled to the T-coupling 18 of each respective installation is the arrest end of the arrest tube 10, which tube angles upwardly from well below the frost line F to a second T-coupling 21 and pit box 22 to the retrieve end and the retrieve capsule box 23. Each T-coupling is provided with a vertical fill and sight tube 24' and 25', respectively, which will indicate the amount of arrest fluid, such as water or water and anti-freeze solution in the arrest tube sections.

In each respective arrest tube section 10 or 10' is an arrest piston 24 connected to the arrest cable 14 or 15, while the retrieve end of each respective piston is coupled by a quick-detachable coupler 26' to the free extended retrieve rope end 25 from the coil of the coiled retrieve capsule 26, see Figure 2. The capsule 26 at the opposite side of the same has another extended free end 27 with coupling means, such as a draft link or ring 28. This ring is engaged over a hook member 29 affixed to a wall of the retrieve pit box 23 for the purpose hereinafter to be explained. Each pit box 19, 22 and 23 is provided with a cover such as is generally shown in Figure 2 and designated 30.

The arrest tube sections 10 and 10' angularly lead upward from the T-coupling 21 to the retrieve box 23 and each end of these respective tubes is open and flared over at 31 to seat solidly in a wall of the box which is formed with an opening to seat the said tube end. The free rope end 25 of the capsule extends from the pit box 23 through this opening into the arrest tube and couples with the piston retrieve coupling 26'.

Each capsule 26 comprises a rope coiled into a closely coiled formation with extended ends 25 and 27, respectively. This complete formation is enveloped in a casing 32, such as a polyethylene bag, wrapper or coating. The casing 32 may be preformed and wrapped on, or the coil formation may be sprayed or dipped to provide the casing 32, as desired. In either event the coating is apertured at each end to permit the free retrieve rope ends 25 and 27, respectively, to extend from the casing 32 to their respective coupling stations or positions when loading the capsule at the battery position of the arrest piston 24.

Each capsule when loaded is inserted in the retrieve pit 23 and rests on a support 33 formed of wooden or metal frame pieces, see Figure 2.

The capsule 26 and the pay-out of the retrieve rope coiled therein may be likened to the hatching of a cocoon. For example, in operation as the rope uncoils during an arresting operation of the piston 24, the wrapper or coating of the capsule 26 becomes empty and the cocoon or casing 32 remains in the retrieve pit, except for a part of the end 27, which remains anchored to the pit wall by the coupling ring 28.

The coupling ring 28 is then manually coupled to the draft gear of a vehicle, such as a jeep or truck, and the piston 24 connected to end 25 of the retrieve rope is returned to battery position by driving the jeep or truck forward along the runway and pulling the piston back to the retrieve end of the arrest tube section 10. When thus returned to position the expended or uncoiled retrieve rope is disconnected from the piston and the tow vehicle and a new capsule 26 is installed in the retrieve pit and connected at each respective extended rope end 25 and 28 thereof to the piston 24 and to the coupler on the wall of the pit 23 for the next operation.

In actual practice, the retrieving operation can be accomplished in approximately five minutes.

The system may be maintained filled with fluid by inserting a hose or a pipe into the retrieve pit box 23, until the sight tubes 24', 25' indicate a full condition. In some instances, it is desirable to have vertical vent tubes 35 arranged in spaced relation along the length of the fluid filled arrest tube portions 10 and 10' to ground level. Also, the fact that all the working or moving parts of the system are readily accessible at ground level even though the installation is below ground is a novel feature of this invention and promotes efficiency and economy in maintenance.

Although only one embodiment of the invention has been illustrated and described in detail, it is to be expressly understood that the invention is not limited thereto. Various changes may be made in the design and arrangement of the parts without departing from the spirit and scope of the invention, as will now occur to others skilled in the art. For a definition of the limits of the invention, reference should be had to the appended claims.

What is claimed is:

1. A novel installation for an energy absorbing means of the class described comprising a plurality of tube sections mounted below ground level longitudinally along a landing surface, each of said sections being formed with an intermediate arrest tube section having a retrieve end and an arrest end installed underground below a known frost line of a known locality, a lead-off tube coupled to the arrest end of said arrest tube section, said lead-off tube being directed angularly upward toward ground level, a box adjacent the retrieve end of each respective arrest tube section having an opening located at ground level, a retrieving means mounted in the box located at the retrieve end of the installation, and a cable extending through the lead-off tube connected to the arrest end of the installation, said cable lead-off tube at ground level serving to direct a cable around surface mounted sheave means.

2. A retrieving capsule for an energy absorber having an arrest piston, said capsule comprising a coil of cable having a pay-out end, a quick-detachable coupler carried by said pay-out end, an anchor end, a coupling means carried by the said anchor end, and an enveloping means enclosing the said coil of cable, said last-named means having an opening at each end for the projection of said cable pay-out and said cable anchor ends, respectively, said capsule being housed in a chamber connecting with an arrest tube having an arrest piston therein, and said capsule being held to position by a support means therefor in the chamber.

3. A retrieving capsule for an energy absorber having an arrest piston, said capsule comprising a coil of cable having a pay-out end, a quick-detachable coupler carried by said pay-out end, an anchor end, a coupling means carried by the said anchor end, and an enveloping means enclosing the said coil of cable, said last-named means having an opening at each end for the projection of said cable pay-out and said cable anchor ends, respectively, said capsule being housed in a chamber connecting with an arrest tube having an arrest piston therein, and said capsule being held to position by a support means therefor in the chamber, said coupling means carried by said anchor end comprising a ring formed to be coupled to the draft coupling of a suitable tow vehicle, said pay-out end of said cable being connected to said arrest piston, to thereby retrieve said arrest piston.

References Cited in the file of this patent

UNITED STATES PATENTS

| | | |
|---|---|---|
| 2,552,594 | Scott | May 15, 1951 |
| 2,713,938 | Snyder | July 26, 1955 |
| 2,731,219 | Cotton | Jan. 17, 1956 |
| 2,771,053 | Gustafson | Nov. 20, 1956 |
| 2,777,653 | Cotton | Jan. 15, 1957 |

OTHER REFERENCES

Pages 86, 87 of Aviation Week, Sept. 23, 1957.